Jan. 15, 1935.   K. F. GALLIMORE   1,987,675
SPINDLE FEED AND DRIVE MECHANISM FOR MACHINE TOOLS
Filed Jan. 23, 1932   2 Sheets-Sheet 2
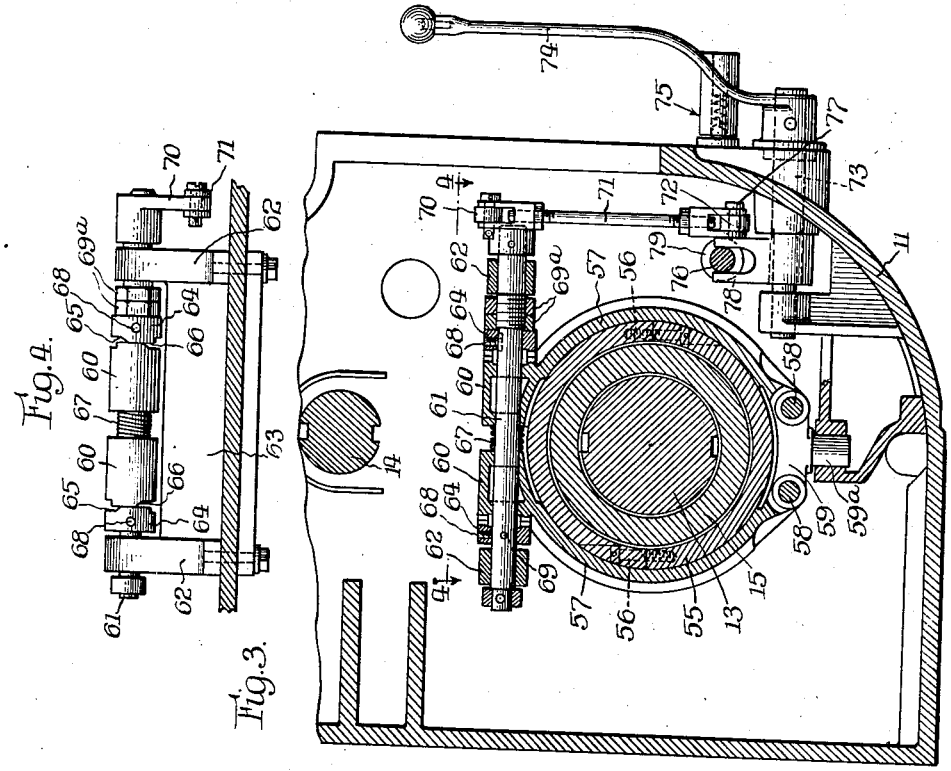
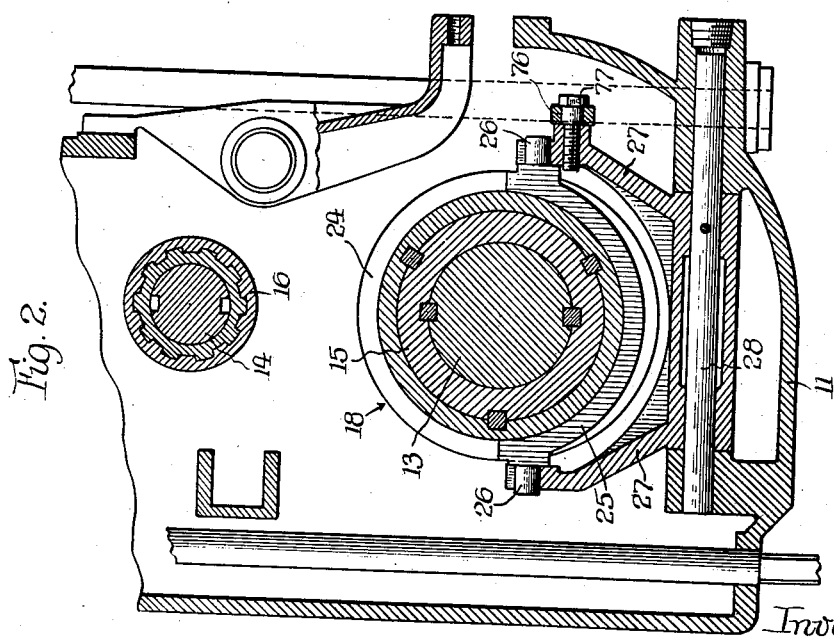
Inventor:
Keith F. Gallimore,
By Chindahl, Parker & Carlson
Attys.

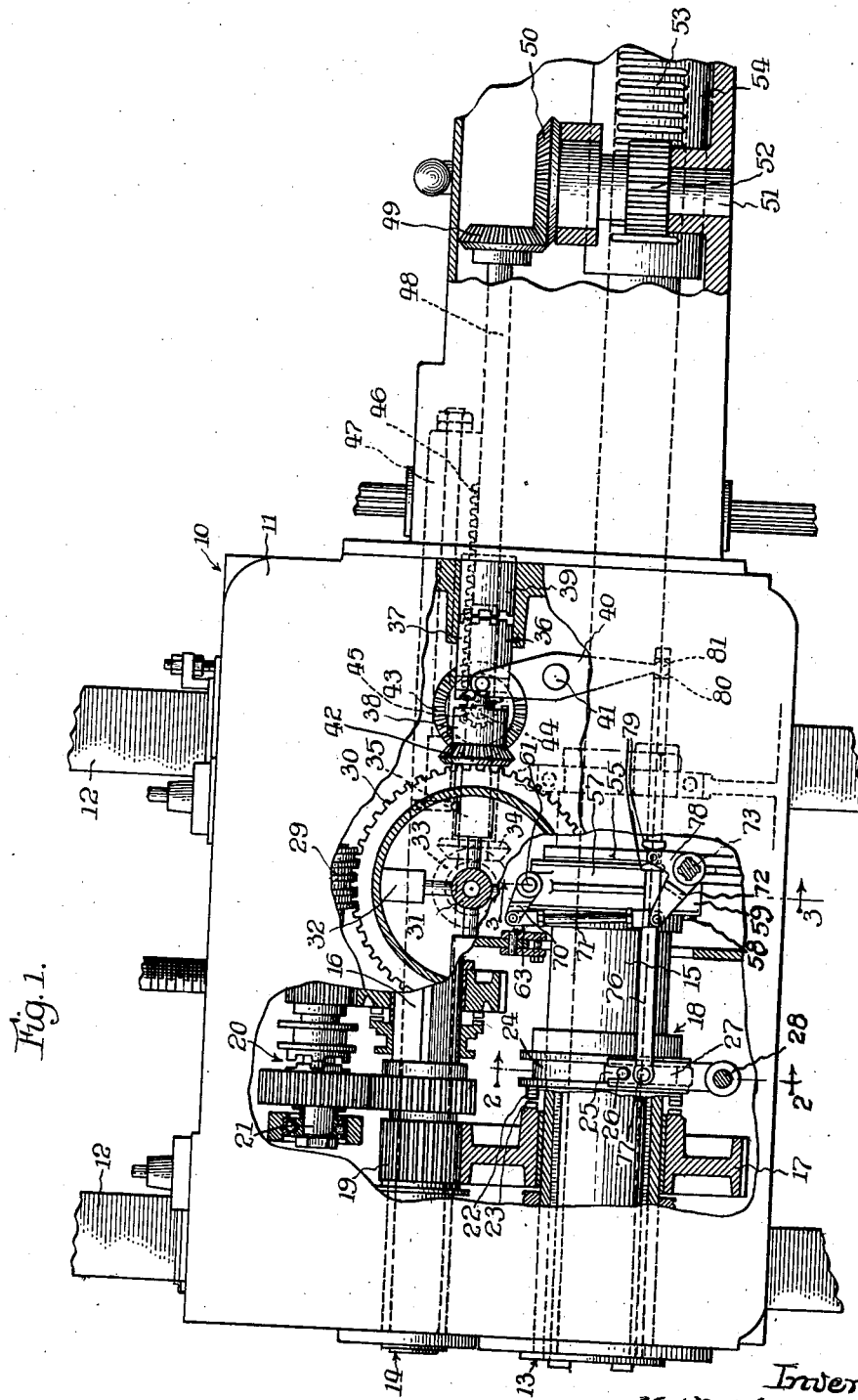

UNITED STATES PATENT OFFICE 1,987,675

SPINDLE FEED AND DRIVE MECHANISM FOR MACHINE TOOLS

Keith F. Gallimore, Fond du Lac, Wis., assignor to Giddings & Lewis Machine Tool Co., Fond du Lac, Wis., a corporation of Wisconsin Application January 23, 1932, Serial No. 588,207

12 Claims. (Cl. 29—26)

The invention relates to improvements in machine tools, and has for its general object the provision, in a machine tool having a rotatable and translatable spindle, of a spindle brake interlocked with the means for rotating and the means for translating the spindle.

A further object is to provide a new and improved spindle brake which is sturdy, effective and compact.

Other objects and advantages will become apparent from the following description taken in connection with the accompanying drawings, in which:

Figure 1 is a fragmentary elevational view, partially in section, of a machine tool embodying the features of the invention.

Fig. 2 is a fragmentary transverse sectional view taken along the line 2—2 of Fig. 1.

Fig. 3 is a fragmentary transverse sectional view taken along the line 3—3 of Fig. 1.

Fig. 4 is a fragmentary plan view of the brake actuating means taken along the line 4—4 of Fig. 3.

The present invention in its broad aspects is adapted for utilization in a large variety of spindle structures, but for purposes of illustration is disclosed as embodied in the spindle headstock 10 of a horizontal boring, drilling and milling machine. The headstock 10 comprises a closed casing 11 mounted for vertical adjustment on upstanding ways 12. Rotatably and preferably slidably mounted in the casing 11 is a horizontal main spindle 13. Preferably an auxiliary spindle 14 is slidably and rotatably mounted in the casing 11 in parallel relation to the main spindle 13.

Since in the preferred embodiment of the invention, the spindles 13 and 14 are both rotatable and slidable, they are longitudinally splined at their operative ends respectively in two parallel horizontal drive sleeves 15 and 16 rotatably journaled but held against endwise movement in the casing 11.

A drive gear 17, adapted to be connected to a suitable source of power, is rotatably mounted on the main sleeve 15, and may be operatively connected thereto on occasion by means of a clutch 18 to drive the main spindle 13. Preferably, the gear 17 meshes with a pinion 19 rotatable with the auxiliary sleeve 16 so that the main spindle 13 is driven from the auxiliary spindle 14, and the latter is always in rotaton as a countershaft when the spindle 13 is being rotated or translated. Obviously, the spindle 14 may be rotated independently of the spindle 13 upon opening the clutch 18. The auxiliary spindle sleeve 16 may be driven from any suitable source (not shown) through a multiple change-speed transmission, including a two speed device 20 from a countershaft 21. Preferably, a substantial speed reduction, for example a ratio of 3:1, is provided from the spindle 14 to the spindle 13.

The clutch 18 is shown as a collar splined for axial movement on the drive sleeve 15 and having end clutch teeth 22 adapted to be brought into and out of engagement with similar end teeth 23 on the hub of the gear 17. The clutch collar is formed with a peripheral annular groove 24 in which is mounted a yoke 25 (see Figs. 1 and 2) having oppositely disposed trunnions 26 on it respective ends rotatably supported in the upstanding bifurcated arms of a fork 27. The latter is rigidly mounted on a shaft 28 rotatably journaled on a fixed axis extending transversely of and below the axis of the main spindle 13.

The means for selectively feeding the spindles axially may be of any preferred form, and is herein shown as comprising a worm 29 having a variable speed drive connection (not shown) with the sleeve 16 and meshing with a worm wheel 30 rotatably mounted on a transverse shaft 31 and adapted to be disengageably connected thereto as by means of a clutch 32. The shaft 31 is connected through bevel gears 33 and 34 to a shaft 35 which is adapted to be operatively connected selectively through a two-way clutch 36 to the two spindles 13 and 14.

The clutch 36 comprises an intermediate clutch sleeve 37 splined for axial movement relative to the shaft 35, and adapted upon movement in opposite directions to connect the latter respectively to two spaced clutch elements or collars 38 and 39. A vertical lever 40 pivoted at 41 is operatively connected at its upper end to the sleeve 37 to adjust the latter as desired.

The clutch element 38 is rotatably mounted on the shaft 35, and is rigid with a bevel gear 42 which meshes with a bevel gear 43 on a shaft 44. A pinion 45 on the shaft 44 meshes with a longitudinal rack 46 formed in a ram sleeve 47 mounted for relative rotation but against relative endwise movement on the auxiliary spindle 14.

The clutch element or collar 39 is fixedly journaled in the casing 11, and is keyed on a shaft 48 coaxial with the shaft 35. A bevel gear 49 on the shaft 48 meshes with a bevel gear 50 on a stub shaft 51. On the latter is mounted a pinion 52 meshing with a longitudinal rack 53 on a ram sleeve 54 mounted on the right end of the main spindle 13 for longitudinal movement therewith but rotatable relatively thereto.

The invention contemplates the provision of a brake (see Figs. 1, 3 and 4) for one of the spindles, namely, the main spindle 13, adapted to control the rotation thereof. The brake, in its preferred form, comprises a collar 55 rigidly secured to the drive sleeve 15 for the main spindle 13, the collar constituting one friction element of the brake. For convenience in manufacture and in attachment to the sleeve 15, the collar 55 is preferably made of two semicircular parts having their complemental ends secured together as by screws 56.

Disposed about the collar 55 is the other friction element of the brake, which comprises, in the present instance, a pair of diametrically opposed arcuate friction shoes 57. Two adjacent ends, i. e. the lower ends, of the shoes 57 are pivotally attached at 58 to a supporting member 59 which has a central pivot pin 59ª pivotally mounted in the casing 11 on an axis perpendicular to the axis of the spindle 13.

The free ends of the shoes 57 are formed respectively with lugs 60 in opposed or aligned relation. Extending through the lugs 60 is a shaft 61 rotatably supported at opposite ends in spaced arms 62 on a bracket 63 attached to the casing 11. Mounted for rotation with the shaft 61 and held against longitudinal movement relative thereto is a pair of cam members 64 positioned adjacent the outer faces of the respective lugs 60. Each cam member 64 has a pair of diametrically opposed cam faces 65 (see Fig. 4) adapted to coact with similar but opposed cam faces 66 on the associated lug 60. The cam faces 65 and 66 at opposite ends of the shaft 61 are so orientated and disposed that upon rotation of the shaft 61 in opposite directions, the cam members 64 will act simultaneously to apply the shoes 57 or release them. A coiled compression spring 67 is disposed on the shaft 61 between and in end abutting engagement with the adjacent faces of the lugs 60, and acts to urge the latter apart when released by the cam members 64.

The cam members 64 are fixed to the shaft 61 as by set screws 68, and one of them is held against longitudinal adjustment on the shaft by a pin 69, while the other is adjustable longitudinally of the shaft, a pair of lock nuts 69ª being provided to secure a fine adjustment and to assist in securing it in its adjusted position.

The means for adjusting the shaft 61 to actuate the brake preferably comprises an arm 70 on one end of the shaft, and connected by a link 71 to one arm 72 of a bell crank secured for rotation with a rock shaft 73 journaled in the front wall of the casing 11. A hand lever 74, with a spring-pressed ball detent 75, is secured to the shaft 73 externally of the casing 11.

Various features of the invention reside in interlocking the brake with the clutch 18 for the main spindle 13, so that when the clutch is opened to disconnect the rotative drive, the brake will automatically be applied and when the rotative drive is connected the brake will automatically be released. To this end, the hand lever 74 also is connected to the clutch fork 27 and constitutes the actuator for the clutch 18. The connection comprises a rod 76 which is pivotally connected at one end, as by a pin 77, to one arm of the fork 27, and which intermediate its ends extends between the bifurcations of another arm 78 of the bell-crank lever on the shaft 73. A pair of collars 79 are secured on the rod 76 in spaced relation and at opposite sides of the arm 78.

The brake is also interlocked with the clutch 36 so that when this clutch is adjusted to connect the feed to the main spindle ram sleeve 47, the brake will be released and the clutch 18 will be closed, and when it is adjusted to connect the feed to the auxiliary ram sleeve 54, the brake will be applied and the clutch 18 will be opened. To establish the interlock, the rod 76 is formed with a notch 80 in one side receiving a ball end 81 on the lower end of the lever 40.

I claim as my invention:

1. In a machine tool, the combination of a rotatable tool spindle, a drive for feeding said spindle axially, a brake for stopping rotation of said spindle, and an interlock between said drive and said brake.

2. In a machine tool, the combination of a tool spindle, a drive for rotating said spindle, a feed drive for said spindle, a brake for said spindle, and an interlock between said drives and said brake.

3. In a machine tool, the combination of a spindle, a rotative sleeve splined on said spindle, a rotative drive, a clutch for connecting said sleeve with said drive, a brake for said sleeve, an interlock between said clutch and said brake, and an axial feeding means for said spindle.

4. In a machine tool, the combination of a first spindle, a second spindle, a drive for said second spindle, a clutch for connecting said first spindle to said second spindle, a brake for said first spindle, and an interlock between said clutch and said brake.

5. In a machine tool, the combination of a first spindle, a second spindle, a rotative sleeve splined on said first spindle, a drive for said second spindle, a clutch for connecting said sleeve to spindle, a brake for said sleeve, an said second spindle, a brake for said sleeve, an interlock between said brake and said clutch, and an axial feeding means for said first spindle.

6. In a machine tool, the combination of two spindles, two rotative sleeves splined on the respective spindles, a driving connection between said sleeves, a clutch in said driving connection, a brake for one of said spindles, feeding means including a selective clutch for connecting said means to said spindles, and an interlock between said brake and said clutches.

7. In a machine tool, the combination of a first rotatable spindle, a second rotatable spindle, a brake for stopping rotation of said second spindle, feeding means for said first spindle including a clutch, and an interlock between said brake and said clutch for engaging said clutch when said brake is applied.

8. In a machine tool, the combination of a spindle, a drive, a clutch for connecting said spindle and drive, axial feeding means for said spindle, a member mounted on and rotatable with said spindle and held against axial movement therewith, a brake for said member, and an interlock between said brake and said clutch.

9. In a machine tool, the combination of a spindle, a rotative sleeve splined on said spindle and held against axial movement, a brake for said sleeve, a drive for feeding said spindle axially relative to said sleeve, and an interlock between said feed drive and said brake.

10. In a machine tool, the combination of a pair of spindles, a driving connection between said spindles, a clutch in said connection, a brake for one of said spindles, feeding means including a selective clutch for connecting said means to said spindles, and an interlock between said brake and spindles, and an interlock between said brake and said clutches arranged to apply said brake when said clutches are disconnected from the spindle to which the brake is applied.

11. In a machine tool, the combination of a pair of spindles parallel to each other, a pair of sleeves mounted on the respective spindles for rotation therewith but held against longitudinal movement, a pinion mounted on one of said sleeves for rotation therewith, means for driving said pinion, a gear loosely mounted on the other of said sleeves and meshing with said pinion, a clutch for connecting said gear to said other sleeve, a brake coacting with said other sleeve for stopping rotation thereof and of the spindle therein, a pair of feeding means for the respective spindles, a drive for said feeding means, a clutch for selectively connecting said drive to one or the other of said feeding means, and an interlock between said brake and said clutches arranged to apply said brake when said first-mentioned clutch is open and said last-mentioned clutch is disconnected from the feeding means for the spindle controlled by said brake.

12. In a machine tool, the combination of a rotatable and longitudinally reciprocable spindle, a sleeve on said spindle rotatable therewith but held against longitudinal movement, a drive gear loosely mounted on said sleeve, a clutch for connecting said gear to said sleeve to rotate the spindle, a brake on said sleeve to hold the spindle against rotation, a feed drive for said spindle, a clutch for said feed drive, and an interlock for said clutches and said brake and operable to engage said clutches when the brake is disengaged and to disengage said clutches when said brake is engaged.

KEITH F. GALLIMORE.